(12) United States Patent
Capata et al.

(10) Patent No.: US 8,494,286 B2
(45) Date of Patent: Jul. 23, 2013

(54) FACE DETECTION IN MID-SHOT DIGITAL IMAGES

(75) Inventors: Adrian Capata, Galway (IE); Vlad Poenaru, Bucharest (RO); Eran Steinberg, San Francisco, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 1474 days.

(21) Appl. No.: 12/026,484

(22) Filed: Feb. 5, 2008

(65) Prior Publication Data

US 2009/0196466 A1 Aug. 6, 2009

(51) Int. Cl.
*G06K 9/00* (2006.01)

(52) U.S. Cl.
USPC .......................................... 382/218; 382/103

(58) Field of Classification Search
USPC .......................................... 382/103, 118, 218
See application file for complete search history.

(56) References Cited

U.S. PATENT DOCUMENTS

| | | |
|---|---|---|
| 4,047,187 A | 9/1977 | Mashimo et al. |
| 4,168,510 A | 9/1979 | Kaiser |
| 4,317,991 A | 3/1982 | Stauffer |
| 4,367,027 A | 1/1983 | Stauffer |
| RE31,370 E | 9/1983 | Mashimo et al. |
| 4,448,510 A | 5/1984 | Murakoshi |
| 4,456,354 A | 6/1984 | Mizokami |
| 4,469,417 A | 9/1984 | Masunaga et al. |
| 4,562,346 A | 12/1985 | Hayashi et al. |
| 4,638,364 A | 1/1987 | Hiramatsu |
| 4,673,276 A | 6/1987 | Yoshida et al. |
| 4,690,536 A | 9/1987 | Nakai et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,061,951 A | 10/1991 | Higashihara et al. |
| 5,063,603 A | 11/1991 | Burt |
| 5,111,231 A | 5/1992 | Tokunaga |
| 5,130,935 A | 7/1992 | Takiguchi |

(Continued)

FOREIGN PATENT DOCUMENTS

| | | |
|---|---|---|
| EP | 1128316 A1 | 8/2001 |
| EP | 1441497 A2 | 7/2004 |

(Continued)

OTHER PUBLICATIONS

Final Office Action mailed Mar 23, 2010, for U.S. Appl. No. 11/688,236, filed Mar. 19, 2007.

(Continued)

*Primary Examiner* — Gregory M Desire
(74) *Attorney, Agent, or Firm* — Andrew V. Smith

(57) ABSTRACT

A method for detecting a face in a mid-shot digital image of a person comprises capturing first and second mid-shot digital images of nominally the same scene using different capture settings such that the foreground is differently differentiated from the background in each image, and comparing the first and second images to determine the foreground region of the images. A portion of the foreground region likely to correspond to a face is estimated based upon the geometry of the foreground region.

25 Claims, 3 Drawing Sheets

(a)

(b)

(c)

(d)

U.S. PATENT DOCUMENTS

| | | | |
|---|---|---|---|
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,262,820 A | 11/1993 | Tamai et al. |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,576,759 A | 11/1996 | Kawamura et al. |
| 5,629,752 A | 5/1997 | Kinjo |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,790 A | 6/1998 | Brunelli et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,963,670 A | 10/1999 | Lipson et al. |
| 5,966,549 A | 10/1999 | Hara et al. |
| 5,978,519 A | 11/1999 | Bollman et al. |
| 5,991,456 A | 11/1999 | Rahman et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,157,677 A | 12/2000 | Martens et al. |
| 6,173,068 B1 | 1/2001 | Prokoski |
| 6,181,805 B1 | 1/2001 | Koike et al. |
| 6,184,926 B1 | 2/2001 | Khosravi et al. |
| 6,188,777 B1 | 2/2001 | Darrell et al. |
| 6,192,149 B1 | 2/2001 | Eschbach et al. |
| 6,240,198 B1 | 5/2001 | Rehg et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,282,317 B1 | 8/2001 | Luo et al. |
| 6,285,410 B1 | 9/2001 | Marni |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,393,136 B1 | 5/2002 | Amir et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,456,732 B1 | 9/2002 | Kimbell et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,483,521 B1 | 11/2002 | Takahashi et al. |
| 6,501,857 B1 | 12/2002 | Gotsman et al. |
| 6,502,107 B1 | 12/2002 | Nishida |
| 6,504,546 B1 | 1/2003 | Cosatto et al. |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,560,029 B1 | 5/2003 | Dobbie et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,117 B1 * | 8/2003 | Windle ................. 348/239 |
| 6,606,398 B2 | 8/2003 | Cooper |
| 6,633,655 B1 | 10/2003 | Hong et al. |
| 6,661,907 B2 | 12/2003 | Ho et al. |
| 6,661,918 B1 * | 12/2003 | Gordon et al. ........ 382/173 |
| 6,678,407 B1 | 1/2004 | Tajima |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,156 B2 | 11/2004 | Sukeno et al. |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,859,565 B2 | 2/2005 | Baron |
| 6,876,755 B1 | 4/2005 | Taylor et al. |
| 6,879,705 B1 | 4/2005 | Tao et al. |
| 6,885,760 B2 | 4/2005 | Yamada et al. |
| 6,900,840 B1 | 5/2005 | Schinner et al. |
| 6,937,773 B1 | 8/2005 | Nozawa et al. |
| 6,940,545 B1 | 9/2005 | Ray et al. |
| 6,959,109 B2 | 10/2005 | Moustafa |
| 6,965,684 B2 | 11/2005 | Chen et al. |
| 6,977,687 B1 | 12/2005 | Suh |
| 6,993,157 B1 | 1/2006 | Oue et al. |
| 7,003,135 B2 | 2/2006 | Hsieh et al. |

| Patent No. | Date | Inventor |
|---|---|---|
| 7,020,337 B2 | 3/2006 | Viola et al. |
| 7,024,053 B2 | 4/2006 | Enomoto |
| 7,027,619 B2 | 4/2006 | Pavlidis et al. |
| 7,027,621 B1 | 4/2006 | Prokoski |
| 7,034,848 B2 | 4/2006 | Sobol |
| 7,035,456 B2 | 4/2006 | Lestideau |
| 7,035,462 B2 | 4/2006 | White et al. |
| 7,035,467 B2 | 4/2006 | Nicponski |
| 7,038,709 B1 | 5/2006 | Verghese |
| 7,038,715 B1 | 5/2006 | Flinchbaugh |
| 7,039,222 B2 | 5/2006 | Simon et al. |
| 7,042,511 B2 | 5/2006 | Lin |
| 7,043,465 B2 | 5/2006 | Pirim |
| 7,050,607 B2 | 5/2006 | Li et al. |
| 7,057,653 B1 | 6/2006 | Kubo |
| 7,064,776 B2 | 6/2006 | Sumi et al. |
| 7,082,212 B2 | 7/2006 | Liu et al. |
| 7,088,386 B2 | 8/2006 | Goto |
| 7,099,510 B2 | 8/2006 | Jones et al. |
| 7,103,218 B2 * | 9/2006 | Chen et al. ............... 382/170 |
| 7,106,374 B1 | 9/2006 | Bandera et al. |
| 7,106,887 B2 | 9/2006 | Kinjo |
| 7,110,569 B2 | 9/2006 | Brodsky et al. |
| 7,110,575 B2 | 9/2006 | Chen et al. |
| 7,113,641 B1 | 9/2006 | Eckes et al. |
| 7,119,838 B2 | 10/2006 | Zanzucchi et al. |
| 7,120,279 B2 | 10/2006 | Chen et al. |
| 7,151,843 B2 | 12/2006 | Rui et al. |
| 7,158,680 B2 | 1/2007 | Pace |
| 7,162,076 B2 | 1/2007 | Liu |
| 7,162,101 B2 | 1/2007 | Itokawa et al. |
| 7,171,023 B2 | 1/2007 | Kim et al. |
| 7,171,025 B2 | 1/2007 | Rui et al. |
| 7,190,806 B2 * | 3/2007 | Cazier ..................... 382/100 |
| 7,190,829 B2 | 3/2007 | Zhang et al. |
| 7,194,114 B2 | 3/2007 | Schneiderman |
| 7,200,249 B2 | 4/2007 | Okubo et al. |
| 7,200,266 B2 * | 4/2007 | Ozer et al. ................ 382/173 |
| 7,218,759 B1 | 5/2007 | Ho et al. |
| 7,227,976 B1 | 6/2007 | Jung et al. |
| 7,254,257 B2 | 8/2007 | Kim et al. |
| 7,269,292 B2 | 9/2007 | Steinberg |
| 7,274,822 B2 | 9/2007 | Zhang et al. |
| 7,274,832 B2 | 9/2007 | Nicponski |
| 7,295,233 B2 | 11/2007 | Steinberg et al. |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,321,391 B2 | 1/2008 | Ishige |
| 7,324,693 B2 * | 1/2008 | Chen .......................... 382/199 |
| 7,336,821 B2 | 2/2008 | Ciuc et al. |
| 7,340,110 B2 | 3/2008 | Lim et al. |
| 7,352,393 B2 | 4/2008 | Sakamoto |
| 7,362,368 B2 | 4/2008 | Steinberg et al. |
| 7,403,643 B2 | 7/2008 | Ianculescu et al. |
| 7,430,335 B2 * | 9/2008 | Dumitras et al. ............. 382/260 |
| 7,436,998 B2 | 10/2008 | Steinberg et al. |
| 7,440,593 B1 | 10/2008 | Steinberg et al. |
| 7,457,477 B2 | 11/2008 | Petschnigg et al. |
| 7,460,695 B2 | 12/2008 | Steinberg et al. |
| 7,469,055 B2 | 12/2008 | Corcoran et al. |
| 7,502,494 B2 | 3/2009 | Tafuku et al. |
| 7,512,262 B2 * | 3/2009 | Criminisi et al. ............ 382/154 |
| 7,515,739 B2 * | 4/2009 | Porter et al. ................. 382/118 |
| 7,515,740 B2 | 4/2009 | Corcoran et al. |
| 7,522,772 B2 * | 4/2009 | Porter et al. ................. 382/218 |
| 7,536,036 B2 | 5/2009 | Steinberg et al. |
| 7,551,211 B2 | 6/2009 | Taguchi et al. |
| 7,565,030 B2 | 7/2009 | Steinberg et al. |
| 7,587,085 B2 | 9/2009 | Steinberg et al. |
| 7,612,794 B2 | 11/2009 | He et al. |
| 7,620,214 B2 | 11/2009 | Chen et al. |
| 7,620,218 B2 | 11/2009 | Steinberg et al. |
| 7,623,177 B2 | 11/2009 | Nakamura et al. |
| 7,623,733 B2 | 11/2009 | Hirosawa |
| 7,630,561 B2 * | 12/2009 | Porter et al. ................. 382/218 |
| 7,636,485 B2 | 12/2009 | Simon et al. |
| 7,636,486 B2 | 12/2009 | Steinberg et al. |
| 7,652,693 B2 | 1/2010 | Miyashita et al. |
| 7,689,009 B2 | 3/2010 | Corcoran et al. |
| 7,733,388 B2 | 6/2010 | Asaeda |
| 7,738,015 B2 | 6/2010 | Steinberg et al. |
| 7,792,335 B2 | 9/2010 | Steinberg et al. |
| 7,868,922 B2 | 1/2011 | Ciuc et al. |
| 7,920,723 B2 | 4/2011 | Nanu et al. |
| 7,953,251 B1 | 5/2011 | Steinberg et al. |
| 8,055,029 B2 | 11/2011 | Petrescu et al. |
| 8,073,286 B2 | 12/2011 | David et al. |
| 8,135,184 B2 | 3/2012 | Steinberg et al. |
| 8,306,283 B2 * | 11/2012 | Zhang et al. ................ 382/118 |
| 2001/0005222 A1 | 6/2001 | Yamaguchi |
| 2001/0028731 A1 | 10/2001 | Covell et al. |
| 2001/0031142 A1 | 10/2001 | Whiteside |
| 2001/0038712 A1 | 11/2001 | Loce et al. |
| 2001/0038714 A1 | 11/2001 | Masumoto et al. |
| 2002/0081003 A1 | 6/2002 | Sobol |
| 2002/0105662 A1 | 8/2002 | Patton et al. |
| 2002/0106114 A1 | 8/2002 | Yan et al. |
| 2002/0114535 A1 | 8/2002 | Luo |
| 2002/0118287 A1 | 8/2002 | Grosvenor et al. |
| 2002/0136433 A1 | 9/2002 | Lin |
| 2002/0150291 A1 | 10/2002 | Naf et al. |
| 2002/0150662 A1 | 10/2002 | Dewis et al. |
| 2002/0168108 A1 | 11/2002 | Loui et al. |
| 2002/0172419 A1 | 11/2002 | Lin et al. |
| 2002/0176609 A1 | 11/2002 | Hsieh et al. |
| 2002/0176610 A1 | 11/2002 | Okazaki et al. |
| 2002/0181801 A1 | 12/2002 | Needham et al. |
| 2002/0191861 A1 | 12/2002 | Cheatle |
| 2003/0023974 A1 | 1/2003 | Dagtas et al. |
| 2003/0025812 A1 | 2/2003 | Slatter |
| 2003/0035573 A1 | 2/2003 | Duta et al. |
| 2003/0048950 A1 | 3/2003 | Savakis et al. |
| 2003/0052991 A1 | 3/2003 | Stavely et al. |
| 2003/0059107 A1 | 3/2003 | Sun et al. |
| 2003/0059121 A1 | 3/2003 | Savakis et al. |
| 2003/0071908 A1 | 4/2003 | Sannoh et al. |
| 2003/0084065 A1 | 5/2003 | Lin et al. |
| 2003/0107649 A1 | 6/2003 | Flickner et al. |
| 2003/0117501 A1 | 6/2003 | Shirakawa |
| 2003/0118216 A1 | 6/2003 | Goldberg |
| 2003/0123713 A1 | 7/2003 | Geng |
| 2003/0123751 A1 | 7/2003 | Krishnamurthy et al. |
| 2003/0142209 A1 | 7/2003 | Yamazaki et al. |
| 2003/0151674 A1 | 8/2003 | Lin |
| 2003/0169907 A1 | 9/2003 | Edwards et al. |
| 2003/0174773 A1 | 9/2003 | Comaniciu et al. |
| 2003/0202715 A1 | 10/2003 | Kinjo |
| 2004/0022435 A1 | 2/2004 | Ishida |
| 2004/0095359 A1 | 5/2004 | Simon et al. |
| 2004/0120391 A1 | 6/2004 | Lin et al. |
| 2004/0120399 A1 | 6/2004 | Kato |
| 2004/0170397 A1 | 9/2004 | Ono |
| 2004/0175021 A1 | 9/2004 | Porter et al. |
| 2004/0179719 A1 | 9/2004 | Chen et al. |
| 2004/0218832 A1 | 11/2004 | Luo et al. |
| 2004/0223649 A1 | 11/2004 | Zacks et al. |
| 2004/0227978 A1 | 11/2004 | Enomoto |
| 2004/0228505 A1 | 11/2004 | Sugimoto |
| 2004/0264744 A1 | 12/2004 | Zhang et al. |
| 2005/0007486 A1 | 1/2005 | Fujii et al. |
| 2005/0013479 A1 | 1/2005 | Xiao et al. |
| 2005/0036044 A1 | 2/2005 | Funakura |
| 2005/0041121 A1 | 2/2005 | Steinberg et al. |
| 2005/0068446 A1 | 3/2005 | Steinberg et al. |
| 2005/0068452 A1 | 3/2005 | Steinberg et al. |
| 2005/0069208 A1 | 3/2005 | Morisada |
| 2005/0089218 A1 | 4/2005 | Chiba |
| 2005/0104848 A1 | 5/2005 | Yamaguchi et al. |
| 2005/0105780 A1 | 5/2005 | Ioffe |
| 2005/0129278 A1 | 6/2005 | Rui et al. |
| 2005/0140801 A1 | 6/2005 | Prilutsky et al. |
| 2005/0185054 A1 | 8/2005 | Edwards et al. |
| 2005/0195317 A1 | 9/2005 | Myoga |
| 2005/0248664 A1 * | 11/2005 | Enge ....................... 348/222.1 |
| 2005/0275721 A1 | 12/2005 | Ishii |
| 2006/0006077 A1 | 1/2006 | Mosher et al. |
| 2006/0008152 A1 | 1/2006 | Kumar et al. |

| | | |
|---|---|---|
| 2006/0008173 A1 | 1/2006 | Matsugu et al. |
| 2006/0018517 A1* | 1/2006 | Chen et al. .................. 382/115 |
| 2006/0029265 A1 | 2/2006 | Kim et al. |
| 2006/0039690 A1 | 2/2006 | Steinberg et al. |
| 2006/0050933 A1 | 3/2006 | Adam et al. |
| 2006/0093238 A1 | 5/2006 | Steinberg et al. |
| 2006/0098875 A1 | 5/2006 | Sugimoto |
| 2006/0098890 A1 | 5/2006 | Steinberg et al. |
| 2006/0120599 A1 | 6/2006 | Steinberg et al. |
| 2006/0140455 A1 | 6/2006 | Costache et al. |
| 2006/0147192 A1 | 7/2006 | Zhang et al. |
| 2006/0177100 A1 | 8/2006 | Zhu et al. |
| 2006/0177131 A1 | 8/2006 | Porikli |
| 2006/0203106 A1 | 9/2006 | Lawrence et al. |
| 2006/0203107 A1 | 9/2006 | Steinberg et al. |
| 2006/0203108 A1 | 9/2006 | Steinberg et al. |
| 2006/0204034 A1 | 9/2006 | Steinberg et al. |
| 2006/0204054 A1 | 9/2006 | Steinberg et al. |
| 2006/0204055 A1 | 9/2006 | Steinberg et al. |
| 2006/0204056 A1 | 9/2006 | Steinberg et al. |
| 2006/0204057 A1 | 9/2006 | Steinberg |
| 2006/0204058 A1 | 9/2006 | Kim et al. |
| 2006/0204110 A1 | 9/2006 | Steinberg et al. |
| 2006/0210264 A1 | 9/2006 | Saga |
| 2006/0215924 A1 | 9/2006 | Steinberg et al. |
| 2006/0228037 A1 | 10/2006 | Simon et al. |
| 2006/0257047 A1 | 11/2006 | Kameyama et al. |
| 2006/0268150 A1 | 11/2006 | Kameyama et al. |
| 2006/0269270 A1 | 11/2006 | Yoda et al. |
| 2006/0280380 A1 | 12/2006 | Li |
| 2006/0285754 A1 | 12/2006 | Steinberg et al. |
| 2006/0291739 A1 | 12/2006 | Li et al. |
| 2007/0018966 A1 | 1/2007 | Blythe et al. |
| 2007/0035628 A1 | 2/2007 | Kanai |
| 2007/0047768 A1 | 3/2007 | Gordon et al. |
| 2007/0070440 A1 | 3/2007 | Li et al. |
| 2007/0071347 A1 | 3/2007 | Li et al. |
| 2007/0091203 A1 | 4/2007 | Peker et al. |
| 2007/0098303 A1 | 5/2007 | Gallagher et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0122056 A1 | 5/2007 | Steinberg et al. |
| 2007/0133901 A1 | 6/2007 | Aiso |
| 2007/0154095 A1 | 7/2007 | Cao et al. |
| 2007/0154096 A1 | 7/2007 | Cao et al. |
| 2007/0160307 A1 | 7/2007 | Steinberg et al. |
| 2007/0189606 A1 | 8/2007 | Ciuc et al. |
| 2007/0189748 A1 | 8/2007 | Drimbarean et al. |
| 2007/0189757 A1 | 8/2007 | Steinberg et al. |
| 2007/0201724 A1 | 8/2007 | Steinberg et al. |
| 2007/0201725 A1 | 8/2007 | Steinberg et al. |
| 2007/0201726 A1 | 8/2007 | Steinberg et al. |
| 2007/0201853 A1* | 8/2007 | Petschnigg .................. 396/155 |
| 2007/0296833 A1 | 12/2007 | Corcoran et al. |
| 2008/0013798 A1 | 1/2008 | Ionita et al. |
| 2008/0013799 A1 | 1/2008 | Steinberg et al. |
| 2008/0013800 A1 | 1/2008 | Steinberg et al. |
| 2008/0019565 A1 | 1/2008 | Steinberg |
| 2008/0019669 A1* | 1/2008 | Girshick et al. .............. 386/117 |
| 2008/0037827 A1 | 2/2008 | Corcoran et al. |
| 2008/0037838 A1 | 2/2008 | Ianculescu et al. |
| 2008/0037839 A1 | 2/2008 | Corcoran et al. |
| 2008/0037840 A1 | 2/2008 | Steinberg et al. |
| 2008/0043122 A1 | 2/2008 | Steinberg et al. |
| 2008/0049970 A1 | 2/2008 | Ciuc et al. |
| 2008/0055433 A1 | 3/2008 | Steinberg et al. |
| 2008/0075385 A1 | 3/2008 | David et al. |
| 2008/0143866 A1* | 6/2008 | Nakahara .................... 348/345 |
| 2008/0144966 A1 | 6/2008 | Steinberg et al. |
| 2008/0158407 A1* | 7/2008 | Funamoto .................... 348/345 |
| 2008/0175481 A1 | 7/2008 | Petrescu et al. |
| 2008/0205712 A1 | 8/2008 | Ionita et al. |
| 2008/0219517 A1 | 9/2008 | Blonk et al. |
| 2008/0240555 A1 | 10/2008 | Nanu et al. |
| 2008/0267461 A1 | 10/2008 | Ianculescu et al. |
| 2008/0316327 A1 | 12/2008 | Steinberg et al. |
| 2008/0316328 A1 | 12/2008 | Steinberg et al. |
| 2008/0317339 A1 | 12/2008 | Steinberg et al. |
| 2008/0317378 A1 | 12/2008 | Steinberg et al. |
| 2008/0317379 A1 | 12/2008 | Steinberg et al. |
| 2009/0002514 A1 | 1/2009 | Steinberg et al. |
| 2009/0003652 A1 | 1/2009 | Steinberg et al. |
| 2009/0003708 A1 | 1/2009 | Steinberg et al. |
| 2009/0052749 A1 | 2/2009 | Steinberg et al. |
| 2009/0052750 A1 | 2/2009 | Steinberg et al. |
| 2009/0087030 A1 | 4/2009 | Steinberg et al. |
| 2009/0087042 A1 | 4/2009 | Steinberg et al. |
| 2009/0116698 A1* | 5/2009 | Zhang et al. .................. 382/111 |
| 2009/0128644 A1* | 5/2009 | Camp et al. .................. 348/218.1 |
| 2009/0175609 A1 | 7/2009 | Tan |
| 2010/0060727 A1 | 3/2010 | Steinberg et al. |
| 2011/0069888 A1* | 3/2011 | Lim et al. .................... 382/190 |
| 2011/0122297 A1 | 5/2011 | Steinberg et al. |
| 2011/0221936 A1 | 9/2011 | Steinberg et al. |
| 2012/0069198 A1 | 3/2012 | Steinberg et al. |
| 2012/0069222 A1 | 3/2012 | Steinberg et al. |

FOREIGN PATENT DOCUMENTS

| | | |
|---|---|---|
| EP | 1453002 A2 | 9/2004 |
| EP | 1626569 A1 | 2/2006 |
| EP | 1887511 A1 | 2/2008 |
| GB | 2370438 A1 | 6/2002 |
| JP | 5260360 A2 | 10/1993 |
| JP | 2003-030647 A | 1/2003 |
| JP | 25164475 A2 | 6/2005 |
| JP | 26005662 A2 | 1/2006 |
| JP | 26254358 A2 | 9/2006 |
| WO | WO 00/76398 A1 | 12/2000 |
| WO | WO-02052835 A2 | 7/2002 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | WO 2007/128117 A1 | 11/2007 |
| WO | WO 2007/142621 A1 | 12/2007 |
| WO | WO-2007142621 A1 | 12/2007 |
| WO | WO-2008015586 A2 | 2/2008 |
| WO | WO-2008015586 A3 | 2/2008 |
| WO | WO-2008018887 A1 | 2/2008 |
| WO | WO-2008023280 A2 | 2/2008 |
| WO | WO-2008104549 A2 | 9/2008 |
| WO | WO 2008/157792 A1 | 12/2008 |

OTHER PUBLICATIONS

Final Office Action mailed Nov. 18, 2009, for U.S. Appl. No. 11/554,539, filed Oct. 30, 2006.

Machin, et al., "Real Time Facial Motion Analysis for Virtual Teleconferencing," IEEE, 1996, pp. 340- 344.

Ming, et al., "Human Face Orientation Estimation Using Symmetry and Feature Points Analysis," IEEE, 2000, pp. 1419-1422.

Non-Final Office Action mailed Apr. 2, 2010, for U.S. Appl. No. 10/608,784, filed Jun 26, 2003.

Non-Final Office Action mailed Apr. 30, 2010, for U.S. Appl. No. 11/765,899, filed Jun. 20, 2007.

Non-Final Office Action mailed Aug. 19, 2009, for U.S. Appl. No. 11/773,815, filed Jul. 5, 2007.

Non-Final Office Action mailed Aug. 20, 2009, for U.S. Appl. No. 11/773,855, filed Jul. 5, 2007.

Non-Final Office Action mailed Jan. 20, 2010, for U.S. Appl. No. 12/262,024, filed Oct. 30, 2008.

Non-Final Office Action mailed Jun. 14, 2010, for U.S. Appl. No. 11/624,683, filed Jan. 18, 2007.

Non-Final Office Action mailed Jun. 16, 2010, for U.S. Appl. No. 12/482,305, filed Jun. 10, 2009.

Non-Final Office Action mailed Jun. 22, 2010, for U.S. Appl. No. 12/055,958, filed Mar. 26, 2008.

Non-Final Office Action mailed Jun. 23, 2010, for U.S. Appl. No. 11/941,156, filed Nov. 18, 2007.

Non-Final Office Action mailed May 12, 2010, for U.S. Appl. No. 11/554,539, filed Oct. 30, 2007.

Non-Final Office Action mailed Sep. 8, 2009, for U.S. Appl. No. 11/688,236, filed Mar. 19, 2007.

Notice of Allowance mailed Sep. 28, 2009, for U.S. Appl. No. 12/262,037, filed Oct. 30, 2008.
PCT Notification of Transmittal of the International Search Report and the Written Opinion of the International Searching Authority, or the Declaration, for PCT Application No. PCT/EP2009/005461, dated Apr. 20, 2010, 12 pages.
Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. 1-83, Retrieved from the Internet : URL: http ://ilab.cs.ucsb.edu/publications/YaoMS.pdf >.
Aoki, Hiroyuki et al., "An Image Storage System Using Complex-Valued Associative Memories. Abstract printed from http://csdl.computer.org/comp/proceedings/icpr/2000/0750/02/07502626abs.htm", International Conference on Pattern Recognition (ICPR '00), 2000, vol. 2.
Batur et al., "Adaptive Active Appearance Models", IEEE Transactions on Image Processing, 2005. pp. 1707-1721, vol. 14—Issue 11.
Beraldin, J.A. et al., "Object Model Creation from Multiple Range Images: Acquisition, Calibration, Model Building and Verification, Abstract printed from http://csdl.computer.org/comp/proccedings/nrc/1997/7943/00/79430326abs.htm", International Conference on Recent Advances in 3-D Digital Imaging and Modeling, 1997.
Beymer, David, "Pose-Invariant face Recognition Using Real and Virtual Views, A.I. Technical Report No. 1574", Mass. Inst. of Technology Artificial Intelligence Laboratory, 1996, pp. 1-176.
Bradski Gary et al., "Learning-Based Computer Vision with Intel's Open Source Computer Vision Library", Intel Technology, 2005, pp. 119-130, vol. 9—Issue 2.
Buenaposada, J., "Efficiently estimating 1-3,16 facial expression and illumination in appearance—based tracking, Retrieved from the Internet: http://www.bmva.ac.uk/binvc/2006/ [retrieved on Sep. 1, 2008]", Proc. British machine vision conference. 2006.
Chang, T., "Texture Analysis and Classification with Tree-Structured Wavelet Transform", IEEE Transactions on Image Processing, 1993, pp. 429-441, vol. 2—Issue 4.
Cootes T. et al., "Modeling Facial Shape and Appearance, S. Li and K. K. Jain (Eds.): "Handbook of face recognition", XP002494037", 2005, Chapter 3, Springer.
Cootes, T.F. et al., "A comparative evaluation of active appearance model algorithms", Proc. 9th British Machine Vison Conference. British Machine Vision Association, 1998, pp. 680-689.
Cootes, T.F. et al., "On representing edge structure for model matching", Proc. IEEE Computer Vision and Pattern Recognition, 2001, pp. 1114-1119.
Corcoran, P. et al., "Automatic Indexing of Consumer Image Collections Using Person Recognition Techniques", Digest of Technical Papers. International Conference on Consumer Electronics, 2005, pp. 127-128.
Costache, G. et al., "In-Camera Person-indexing of Digital Images", Digest of Technical Papers. International Conference on Consumer Electronics, 2006, pp. 339-340.
Crowley, J. et al., "Multi-modal tracking of faces for video communication, http://citeseer.ist.psu.edu/crowley97multimodal.html", In Comp. Vision and Patent Rec., 1997.
Dalton, John, "Digital Cameras and Electronic Color Image Acquisition, Abstract printed from http://csdl.computer.org/comp/proceedings/compcon/1996/7414/00/74140431abs.htm", COMPCON Spring '96—41st IEEE International Conference, 1996.
Demirkir, C. et al., "Face detection using boosted tree classifier stages", Proceedings of the IEEE 12th Signal Processing and Communications Applications Conference, 2004, pp. 575-578.
Donner, Rene et al., "Fast Active Appearance Model Search Using Canonical Correlation Analysis", IEEE Transactions on Pattern Analysis and Machine Intelligence, 2006, pp. 1690-1694, vol. 28—Issue 10.
Drimbarean, A.F. et al., "Image Processing Techniques to Detect and Filter Objectionable Images based on Skin Tone and Shape Recognition", International Conference on Consumer Electronics, 2001, pp. 278-279.

Edwards, G.J. et al., "Advances in active appearance models", International Conference on Computer Vision (ICCV'99), 1999, pp. 137-142.
Edwards, G.J. et al., "Learning to identify and track faces in image sequences, Automatic Face and Gesture Recognition", IEEE Comput. Soc, 1998, pp. 260-265.
Feraud, R. et al., "A Fast and Accurate Face Detector Based on Neural Networks", IEEE Transactions on Pattern Analysis and Machine Intelligence, 2001, pp. 42-53, vol. 23—Issue I.
Fernandez, Anna T. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers.
Froba, B. et al., "Face detection with the modified census transform", Proceedings of the Sixth IEEE International Conference on Automatic Face and Gesture Recognition, 2004, pp. 91-96.
Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proceedings of lasted "Signal and Image Processing", 2002, pp. 1-6.
Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.
Gaubatz, Matthew et al., "Automatic Red-Eye Detection and Correction", IEEE ICIP, Proceedings 2002 Intl Conf on Image Processing, 2002, pp. I-804-I-807, vol. 2—Issue 3.
Gerbrands, J., "On the Relationships Between SVD, KLT, and PCA", Pattern Recognition, 1981, pp. 375-381, vol. 14, Nos. 1-6.
Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.
Hou, Xinwen et al., "Direct Appearance Models", IEEE, 2001, pp. I-828-I-833.
Hu, Wen-Chen et al., "A Line String Image Representation for Image Storage and Retrieval, Abstract printed from http://csdl.computer.oro/comp/proceedings/icmcs/1997/7819/00/78190434abs.htm", International Conference on Multimedia Computing and systems, 1997.
Huang et al., "Image Indexing Using Color Correlograms", Proceedings of the 1997 Conference on Computer Vision and Pattern Recognition (CVPR '97), 1997, pp. 762.
Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.
Huber, Reinhold et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.
Jebara, Tony S. et al., "3D Pose Estimation and Normalization for Face Recognition, A Thesis submitted to the Faculty of Graduate Studies and Research in Partial fulfillment of the requirements of the degree of Bachelor of Engineering", Department of Electrical Engineering, 1996, pp. 1-121, McGill University.
Jones, M et al., "Fast multi-view face detection, http://www.merl.com/papers/docs/TR2003-96.pdf", Mitsubishi Electric Research Lab, 2003, 10 pgs.
Kang, Sing Bing et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.
Kita, Nobuyuki et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st Intl Symposium on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, Michal et al., "Automated Multi-view 3D Image Acquisition in Human Genome Research, Abstract printed from http://csdl.computer.org/comp/proccedings/3pvt/2002/1521/00/15210091abs.htm", 1st International Symposium on 3D Data Processing Visualization and Transmission (3DPVT '02), 2002.

Krishnan, Arun, "Panoramic Image Acquisition, Abstract printed from http://csdl.computer.org/comp/proceedings/cypr/1996/7258/00/72580379abs.htm", Conference on Computer Vision and Pattern Recognition (CVPR '96), 1996.

Lai, J.H. et al., "Face recognition using holistic Fourier in variant features, http://digitalimaging.inf.brad.ac.uk/publication/pr34-1.pdf.", Pattern Recognition, 2001, pp. 95-109, vol. 34.

Lei et al., "A CBIR Method Based on Color-Spatial Feature", IEEE Region 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic, Kresimir et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Computer Graphics, 2003, University of Birmingham.

Matthews, I. et al., "Active appearance models revisited. Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Nordstrom, M.M. et al., "The IMM face database an annotated dataset of 240 face images. http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park, Daechul et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT International Search Report and Written Opinion of the International Searching Authority, or the Declaration, for PCT Application No. PCT/US2006/021393, filed Jun. 2, 2006, paper dated Mar. 29, 2007, 12 pgs.

PCT International Search Report and Written Opinion of the International Searching Authority, or the Declaration, for PCT Application No. PCT/US2006/060392, filed Oct. 31, 2006, paper dated Sep. 19, 2008, 9 pgs.

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/EP2007/006540, Nov. 8, 2007, 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/EP2008/052329, dated Sep. 15, 2008, 12 pages.

PCT Notification of Transmittal of the International Search Report and the Written Opinion of the International Searching Authority, or the Declaration, for PCT Application No. PCT/IB2007/003724, dated Aug. 28, 2008, 9 pages.

Romdhani, S. et al., "Face Identification by Fitting a 3D Morphable Model using linear Shape and Texture Error Functions, XP003018283", European Conference on Computer Vision, 2002, pp. 1-15.

Rowley, Henry A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber-655647andisnumber-14286", IEEE Transactions on Pattern Analysis and Machine Intelligence, 1998. pp. 23-38, p. 92, vol. 20—Issue 1.

Ryu, Hanjin et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G. et al., "Digital color imaging, [Online]. Available: citeseer.ist.psu.edu/sharma97digital.html", IEEE Transactions on Image Processing, 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication (IMAC '95), 1995.

Sim, T. et al., "The CMU Pose, Illumination, and Expression (PIE) Database of Human Faces Robotics Institute, Tech. Report, CMU-RI-TR-01-02", 2001, 18 pgs, Carnegie Mellon University.

Sim, T. et al., "The CMU Pose, Illumination, and Expression (PIE) database, Automatic Face and Gesture Recognition", Fifth IEEE Intl. Conf, IEEE Piscataway, NJ, USA, 2002, 6 pages.

Skocaj, Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", Intl Conf on Pattern Recognition (ICPR '00), 2000, vol. 1.

Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.

Soriano, M. et al., "Making Saturated Facial Images Useful Again, XP002325961, ISSN: 0277-786X", Proceedings of the SPIE, 1999, pp. 113-121, vol. 3826.

Stegmann, M.B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.

Stegmann. M.B. et al., "Multi-band modelling of appearance, XP009104697", Image and Vision Computing, 2003, pp. 61-67, vol. 21—Issue 1.

Stricker et al., "Similarity of color images", SPIE Proc, 1995, pp. 1-12, vol. 2420.

Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", Eight Annual IEEE Symposium on Computer-Based Medical Systems (CBMS '95), 1995.

Tang, Yuan Y. et al., "Information Acquisition and Storage of Forms in Document Processing, Abstract printed from http://csdl.computer.org/comp/proceedings/icdar/1997/7898/00/78980170abs.htm", 4th International Conference Document Analysis and Recognition, 1997, vol. I and II.

Tjahyadi et al., "Application of the DCT Energy Histogram for Face Recognition", Proceedings of the 2nd Intl Conference on Information Technology for Application, 2004. pp. 305-310.

Tkalcic, M. et al., "Colour spaces perceptual, historical and applicational background. ISBN: 0-7803-7763-X", IEEE, EUROCON, 2003, pp. 304-308, vol. 1.

Turk, Matthew et al., "Eigenfaces for Recognition", Journal of Cognitive Neuroscience, 1991, 17 pgs, vol. 3—Issue 1.

Twins Crack Face Recognition Puzzle, Internet article http://www.cnn.com/2003/TECH/ptech/03/10/israel.twins.reut/ index.html, printed Mar. 10, 2003, 3 pages.

U.S. Appl. No. 11/554,539, filed Oct. 30, 2006, entitled Digital Image Processing Using Face Detection and Skin Tone Information.

Viola, P. et al., "Rapid Object Detection using a Boosted Cascade of Simple Features", Proceedings of the 2001 IEEE Computer Society Conference on Computer Vision and Pattern Recognition, 2001, pp. I-511-I-518, vol. 1.

Viola, P. et al., "Robust Real-Time Face Detection", International Journal of Computer Vision, 2004, pp. 137-154, vol. 57—Issue 2, Kluwer Academic Publishers.

Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.

Wan, S.J. et al., "Variance-based color image quantization for frame buffer display", S. K. M. Wong Color Research and Application, 1990, pp. 52-58, vol. 15—Issue 1.

Xin He et al., "Real-Time Human Face Detection in Color Image", International Conference on Machine Learning and Cybernetics, 2003, pp. 2915-2920, vol. 5.

Yang, Ming-Hsuan et al., "Detecting Faces in Images: A Survey, ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue , IEEE Computer Society.

Zhang, Jun et al., "Face Recognition: Eigenface, Elastic Matching, and Neural Nets", Proceedings of the IEEE, 1997, pp. 1423-1435, vol. 85—Issue 9.

Zhao, W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—Issue 4, ACM Press.

Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.

PCT International Preliminary Report on Patentability Chapter I (IB/373), for PCT Application No. PCT/US2008/067746, report dated Dec. 22, 2009, 6 pages.

PCT Written Opinion of the International Search Authority, for PCT Application No. PCT/US2008/067746, report dated Sep. 10, 2008, 5 pages.

Swain et al. (1995) "Defocus-based image segmentation." Proc. 1995 Int'l Conf. on Acoustics, Speech, and Signal Processing, vol. 4 pp. 2403-2406.

Final Rejection, dated Mar. 28, 2012, for U.S. Appl. No. 12/140,827, filed Jun. 17, 2008.

Final Rejection, dated Nov. 21, 2011, for U.S. Appl. No. 12/140,125, filed Jun. 16, 2008.

Final Rejection, dated Nov. 9, 2011, for U.S. Appl. No. 12/140,532, filed Jun. 17, 2008.

Non-final Rejection, dated Aug. 4, 2011, for U.S. Appl. No. 12/140,827, filed Jun. 17, 2008.

Non-final Rejection, dated Dec. 29, 2011, for U.S. Appl. No. 12/140,950, filed Jun. 17, 2008.

Non-final Rejection, dated Feb. 24, 2012, for U.S. Appl. No. 12/141,134, filed Jun. 19, 2008.

Non-final Rejection, dated Jul. 5, 2011, for U.S. Appl. No. 12/140,125, filed Jun. 16, 2008.

Non-final Rejection, dated Mar. 31, 2011, for U.S. Appl. No. 12/140,532, filed Jun. 17, 2008.

Non-final Rejection, dated May 15, 2009, for U.S. Appl. No. 12/141,042, filed Jun. 17, 2008.

Notice of Allowance, dated Apr. 19, 2011, for U.S. Appl. No. 12/947,731, filed Nov. 16, 2010.

Notice of Allowance, dated Jan. 9, 2012, for U.S. Appl. No. 13/113,648, filed May 23, 2011.

Notice of Allowance, dated Sep. 23, 2009, for U.S. Appl. No. 12/141,042, filed Jun. 17, 2008.

* cited by examiner (a)

(b)

(c)

(d)

FACE DETECTION IN MID-SHOT DIGITAL IMAGES

The present invention relates to a method and system for detecting a face in a digital image, and in particular a method and apparatus for detecting a face in a mid-shot digital image of a person. In this context a mid-shot image of a person is an image having a single human figure in the foreground orientated in a generally upright position.

BACKGROUND OF THE INVENTION

Known face tracking applications for digital image acquisition devices include methods of marking human faces in a series of images such as a video stream or a camera preview. Face tracking can be used to indicate to a photographer the locations of faces in an image or to allow post processing of the images based on knowledge of the locations of the faces. Also, face tracker applications can be used in adaptive adjustment of acquisition parameters of an image, such as, focus, exposure and white balance, based on face information in order to produce improved quality of acquired images.

A well-known method of fast-face detection is disclosed in US 2002/0102024, hereinafter Viola-Jones. In Viola-Jones, a chain (cascade) of 32 classifiers based on rectangular (and increasingly refined) Haar features are used with an integral image, derived from an acquired image, by applying the classifiers to a sub-window within the integral image. For a complete analysis of an acquired image, this sub-window is shifted incrementally across the integral image until the entire image has been covered.

A number of variants of the original Viola-Jones algorithm are known in the literature, such as disclosed in U.S. patent application Ser. No. 11/464,083 (FN143). However, such face detection applications are computationally expensive.

It is an object of the present invention to provide an alternative and computationally efficient method of face detection in mid-shot digital images.

DISCLOSURE OF THE INVENTION

The present invention provides a method for detecting a face in a mid-shot digital image of a person as claimed in claim 1.

The invention is based upon the recognition that, for mid-shot digital images, a simple geometric analysis of the foreground can locate the face to a high degree of accuracy, thereby dispensing with the need for complex calculations.

If desired, the presence of a face can be confirmed or denied by, for example, looking for a preponderance of flesh tones within the portion of the foreground identified by the inventive method and presumed to include a face, but this is still far less computationally intensive that the prior art techniques.

BRIEF DESCRIPTION OF THE DRAWINGS

Embodiments of the invention will now be described by way of example with reference to the accompanying drawings, in which.

DESCRIPTION OF THE PREFERRED EMBODIMENT

Figure 1:
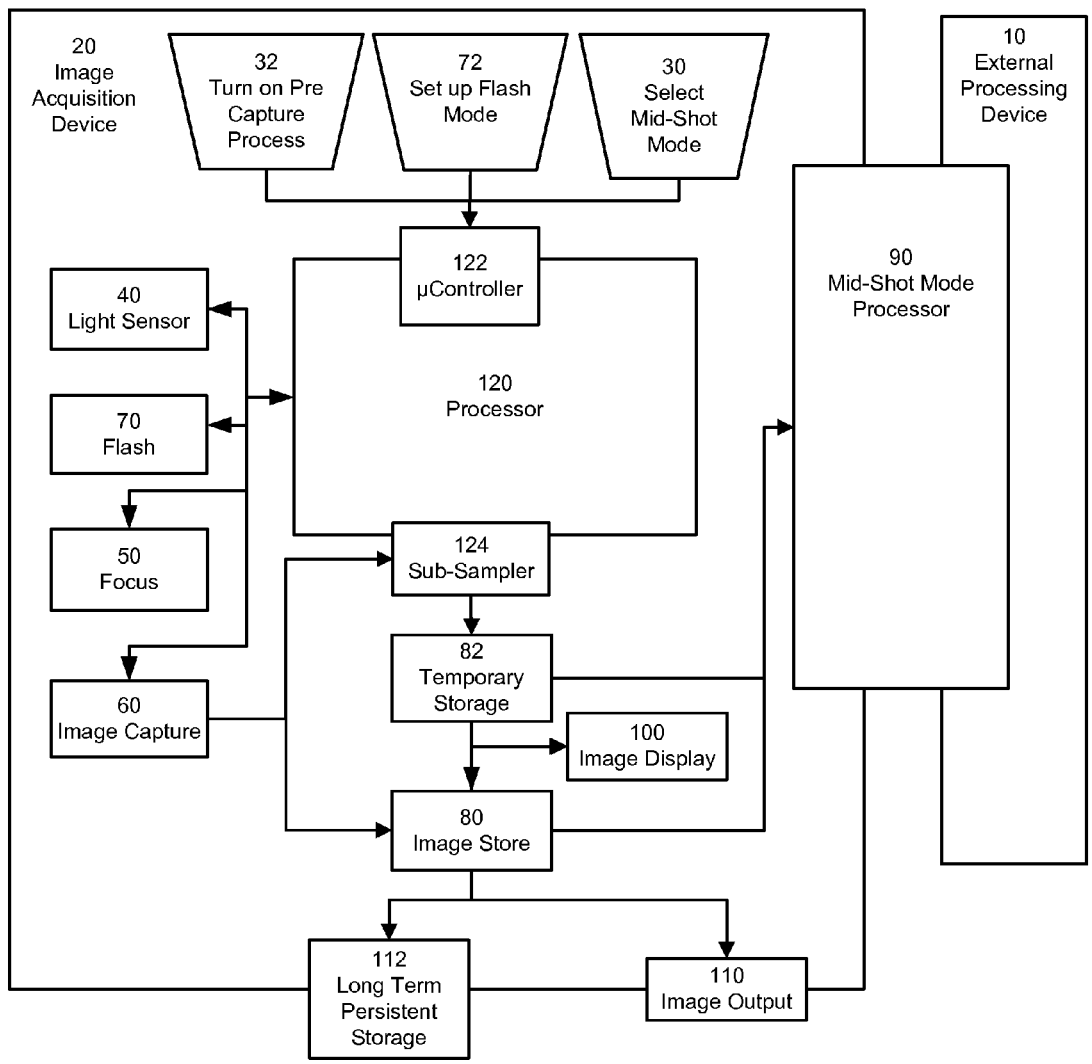
FIG. 1 is a block diagram of a digital image acquisition device operating in accordance with an embodiment of the present invention.

FIG. 1 is a block diagram of a digital image acquisition device 20 which in the present embodiment is a portable digital camera, and includes a processor 120. It can be appreciated that many of the processes implemented in the digital camera may be implemented in or controlled by software operating in a microprocessor, central processing unit, controller, digital signal processor and/or an application specific integrated circuit, collectively depicted as processor 120. Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. If a flash is to be used, processor 120 causes the flash 70 to generate a photographic flash in substantial coincidence with the recording of the image by image capture component 60 upon full depression of the shutter button. The image capture component 60 digitally records the image in colour. The image capture component preferably includes a CCD (charge coupled device) or CMOS to facilitate digital recording. The flash may be selectively generated either in response to the light sensor 40 or a manual input 72 from the user of the image acquisition device. The high resolution image recorded by image capture component 60 is stored in an image store 80 which may comprise computer memory such a dynamic random access memory or a non-volatile memory. The camera is equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by sub-sampling a raw captured image using sub-sampler software 124 which can be part of the general processor 120 or dedicated hardware or combination thereof. Depending on the settings of this hardware subsystem, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the high resolution main image is captured by full depression of the shutter button. More sophisticated criteria may involve analysis of the preview image content, for example, testing the image for changes, before deciding whether the new preview image should replace a previously saved image. Other criteria may be based on image analysis such as the sharpness, or metadata analysis such as the exposure condition, whether a flash is going to happen, and/or the distance to the subject.

If test criteria are not met, the camera continues by capturing the next preview image without saving the current one.

The process continues until the final high resolution main image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in the present embodiment, mid-shot mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images. Post-view images are low resolution images essentially the same as preview images, except that they occur after the main high resolution image is captured.

The image acquisition device 20 has a user-selectable mid-shot mode 30. In mid-shot mode, when the shutter button is depressed the camera is caused to automatically capture and store a series of images at close intervals so that the images are nominally of the same scene. A mid-shot mode face detecting processor 90 analyzes and processes the stored images according to a workflow to be described. The processor 90 can be integral to the image acquisition device 20—indeed, it could be the processor 120 with suitable programming—or part of an external processing device 10 such as a desktop computer. As will be described, the particular number, resolution and sequence of images, whether flash is used or not, and whether the images are in or out of focus, depends upon the particular embodiment. However, in this embodiment the processor 90 receives a main high resolution image from the image store 80 as well as a low resolution post-view image from the temporary storage 82.

Where the mid-shot mode face detecting processor 90 is integral to the image acquisition device 20, the final processed image may be displayed on image display 100, saved on a persistent storage 112 which can be internal or a removable storage such as CF card, SD card or the like, or downloaded to another device, such as a personal computer, server or printer via image output means 110 which can be connected via wire, fiber, or other data transmission means including wireless means. In embodiments where the processor 90 is implemented in an external device 10, such as a desktop computer, the final processed image may be returned to the image acquisition device 20 for storage and display as described above, or stored and displayed externally of the camera.

Figure 2:
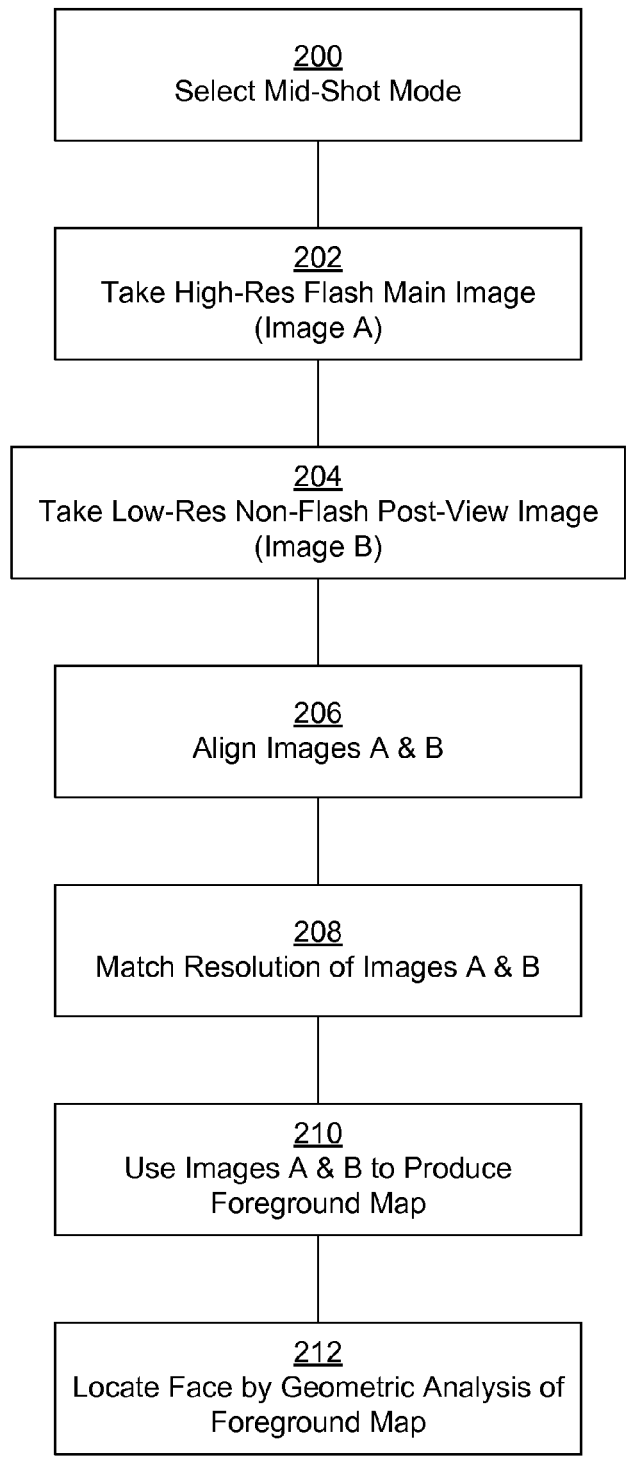
FIG. 2 is a flow diagram of face detection software in the image acquisition device of FIG. 1.

FIG. 2 shows the workflow of a first embodiment of mid-shot mode processing according to the invention.

First, mid-shot mode is selected, step 200. Now, when the shutter button is fully depressed, the camera automatically captures and stores two digital images:
 a main, high pixel resolution, flash image (image A), step 202.
 a post-view, low pixel resolution, non-flash image (image B), step 204.

Figure 3:
FIG. 3 shows images processed according to two alternate image analysis algorithms which may be used in the geometrical analysis step of FIG. 2.
Figure 3:
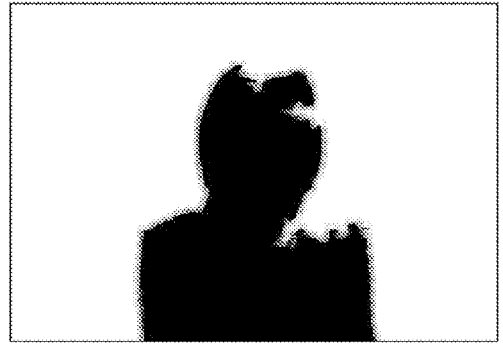
Figure 3:
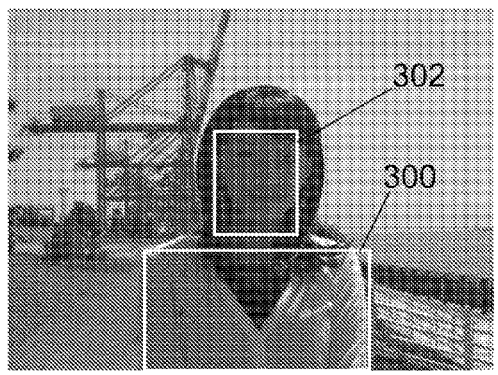
Figure 3:
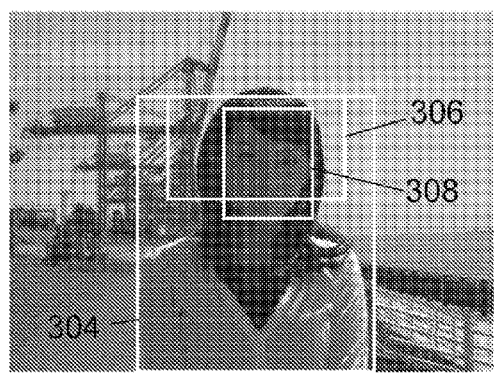

The post-view image B is captured immediately after the main image A, so that the scene captured by each image is nominally the same. If desired image A could be non-flash and image B taken with flash. The important thing, for this embodiment, is that one of them is taken with flash and one without. Normally, for a mid-shot image of a person, the main image A would be the flash image but this will depend on other lighting. An example of a mid-shot image A is shown in FIG. 3(a)—the post-view image B will be substantially the same but of lower resolution.

Steps 200 to 204 just described necessarily take place in the image acquisition device 20. The remaining steps now to be described are performed by the mid-shot processor 90 and can take place in the camera or in an external device 10.

Images A and B are aligned in step 206, to compensate for any slight movement in the subject or camera between taking these images. Techniques for aligning images in this way are well-known. Then, step 208, the images A and B are matched in pixel resolution by up-sampling image B and/or down-sampling image A. Again, this is well-known in the art.

Next, step 210, the flash and non-flash images A and B are used to construct a foreground map, step 210. A foreground map is a set of data defining those regions of the aligned images which belong to the foreground of the images. FIG. 3(b) represents the foreground map for the image of FIG. 3(a), although it is to be understood that the map is not necessarily produced as a visible image. The foreground map locates the foreground subject within the boundaries of the overall image.

In this embodiment, steps 206 to 210 may be carried out in accordance with the method disclosed in U.S. patent application Ser. No. 11/217,788 and PCT Application No. PCT/EP2006/005109 (Ref: FN122), which is hereby incorporated by reference.

Finally, step 212, the portion of the foreground region likely to correspond to a face is identified by analysis of the size and shape of the foreground region. It will be appreciated that such a simple geometric approach to face detection can be used where the approximate size and shape of the subject is known in advance, as is the case for a mid-shot of a single human figure. Two algorithms for detecting the face region will now be described, with reference to FIGS. 3(c) and 3(d).

First, and common to both algorithms, the orientation of the foreground subject in the image relative to the camera is determined, as disclosed in International Patent Application No. PCT/EP2006/008229 (Ref: FN119), which is hereby incorporated by reference. This method is based on the observation that in a normally orientated camera for a normally orientated scene, the close image foreground, in this case, the subject, is at the bottom of the image and the far background is at the top of the image. Alternatively, the orientation of the subject in the image may be ascertained using motion sensors as is well known in the art.

In the first algorithm, FIG. 3(c), the width of the body is estimated using a band of N pixels in the lower (with respect to orientation) part of the image and bounding it to the left and the right. Then this rectangle is grown upwardly until it reaches the shoulders (rectangle 300). The line of the shoulders is determined by computing line-by-line the ratio of foreground and background pixels. When the ratio of background pixels reaches a certain threshold and does so for a number of consecutive lines, the first line encountered is taken to be the one with the shoulders. From this rectangle 300 the position and size of the face area is estimated (rectangle 302) and verified to be fully covered by foreground.

In the second algorithm, FIG. 3(d), the rectangle 304 bounding the foreground is calculated. Then, using the orientation information, the top portion 306 of the bounding rectangle 304 is selected, where the head is assumed to be. For this purpose the general position of the head is computed from a head/body ratio, loosened such that it will contain the head no matter what position it is in (e.g. straight, bent, and so on). The top of the rectangle 306 is coincident with the top of the rectangle 304 and extends down ⅜ of the height of the latter. It is also narrower, being ¾ the width of the rectangle 304 and centred within it.

Now the top rectangle 306 is reduced in width to include only the face. First, the bounding box of the foreground in the previously found rectangle 306 is computed by shrinking rectangle 306 until it contains only foreground pixels. This bounding box may contain hands or false positives from the background which are filtered by selecting the largest rectangle 308 that is the right shape/size and made only of foreground. More particularly, the height of rectangle 308 is computed using body proportions. The face height is estimated to be ²⁄₇th of the height of rectangle 304. The vertical displacement between 308 and 306 is the presumed forehead height.

Variations of the foregoing embodiment are possible. For example, image B could be a preview image rather than a post-view image. Alternatively, both images A and B could be low resolution pre- and/or post-view images, and the foreground map derived therefrom used to identify the face region in a third, high resolution main image. In such a case all three images, i.e. images A and B and the main image, will need to be nominally the same scene. In another embodiment image B could have the same high resolution as the main image A. This would avoid the need to match image resolution at step 208.

In a further embodiment, where the use of flash for one of the images is not desirable, foreground/background separation may be carried out in accordance with the method disclosed in PCT Application No. PCT/EP2006/008229 (Ref: FN119). In this case, the main image A is taken with the foreground more in focus than the background and the other image B is taken with the background more in focus than the foreground. Using the focused and non-focused images, foreground/background separation is carried out to identify the mid-shot subject.

The invention is not limited to the embodiment(s) described herein but can be amended or modified without departing from the scope of the present invention.

The invention claimed is:

1. A method for detecting a face in a mid-shot digital image of a person, the method comprising:
    using a lens, image sensor and processor of a digital image acquisition and processing apparatus,
    capturing first and second mid-shot digital images of approximately a same scene that is known to include at least a face and a portion of a torso of a human person, including using different capture settings such that the foreground is differently differentiated from the background in each image,
    comparing the first and second images to determine the foreground region of the images, and
    identifying a portion of the foreground region likely to correspond to a face based upon matching one or more known face-to-torso geometric relationships to one or more geometric relationships between regions of the foreground region of the first and second images.

2. The method of claim 1, wherein the different capture settings comprise taking one image using a flash and taking the other image without using a flash.

3. The method of claim 1, wherein the different capture settings comprise taking one image with the foreground more in focus than the background and taking the other image with the background more in focus than the foreground.

4. The method of claim 1, wherein the first and second images have different pixel resolutions.

5. The method of claim 4, further comprising matching the pixel resolutions of the first and second images prior to the comparing.

6. The method of claim 1, wherein the first and second images are captured by a digital camera.

7. The method of claim 6, wherein the first image is a relatively high resolution main image, and wherein the second image is a relatively low resolution pre- or post-view version of the first image.

8. The method of claim 6, wherein the first and second images are relatively low resolution pre- and/or post-view versions of a higher resolution main image of said scene also captured by the camera.

9. A digital image acquisition and processing apparatus comprising:
    means for capturing first and second mid-shot digital images of approximately a same scene that is known to include at least a face and a portion of a torso of a human person, including using different capture settings such that the foreground is differently differentiated from the background in each image,
    means for comparing the first and second images to determine the foreground region of the images, and
    means for identifying a portion of the foreground region likely to correspond to a face based upon matching one or more known face-to-torso geometric relationships to one or more geometric relationships between regions of the foreground region of the first and second images.

10. One or more non-transitory processor-readable media having code embedded therein for programming a processor to perform a method for detecting a face in a mid-shot digital image of a person, wherein the method comprises:
    using a lens, image sensor and processor of a digital image acquisition and processing apparatus,
    capturing first and second mid-shot digital images of approximately a same scene that is known to include at least a face and a portion of a torso of a human person, including using different capture settings such that the foreground is differently differentiated from the background in each image,
    comparing the first and second images to determine the foreground region of the images, and
    identifying a portion of the foreground region likely to correspond to a face based upon matching one or more known face-to-torso geometric relationships to one or more geometric relationships between regions of the foreground region of the first and second images.

11. The one or more processor-readable media of claim 10, wherein the different capture settings comprise taking one image using a flash and taking the other image without using a flash.

12. The one or more processor-readable media of claim 10, wherein the different capture settings comprise taking one image with the foreground more in focus than the background and taking the other image with the background more in focus than the foreground.

13. The one or more processor-readable media of claim 10, wherein the first and second images have different pixel resolutions.

14. The one or more processor-readable media of claim 13, wherein the method further comprises matching the pixel resolutions of the first and second images prior to the comparing.

15. The one or more processor-readable media of claim 10, wherein the first and second images are captured by a digital camera.

16. The one or more processor-readable media of claim 15, wherein the first image is a relatively high resolution main image, and wherein the second image is a relatively low resolution pre- or post-view version of the first image.

17. The one or more processor-readable media of claim 15, wherein the first and second images are relatively low resolution pre- and/or post-view versions of a higher resolution main image of said scene also captured by the camera.

18. A digital image acquisition and processing apparatus, comprising:
  a lens;
  an image sensor;
  a processor; and
  a processor-readable medium having code embedded therein for programming the processor to perform a method for detecting a face in a mid-shot digital image of a person, wherein the method comprises:
    capturing first and second mid-shot digital images of approximately a same scene that is known to include at least a face and a portion of a torso of a human person, including using different capture settings such that the foreground is differently differentiated from the background in each image,
    comparing the first and second images to determine the foreground region of the images, and
    identifying a portion of the foreground region likely to correspond to a face based upon matching one or more known face-to-torso geometric relationships to one or more geometric relationships between regions of the foreground region of the first and second images.

19. The apparatus of claim 18, wherein the different capture settings comprise taking one image using a flash and taking the other image without using a flash.

20. The apparatus of claim 18, wherein the different capture settings comprise taking one image with the foreground more in focus than the background and taking the other image with the background more in focus than the foreground.

21. The apparatus of claim 18, wherein the first and second images have different pixel resolutions.

22. The apparatus of claim 21, wherein the method further comprises matching the pixel resolutions of the first and second images prior to the comparing.

23. The apparatus of claim 18, wherein the first and second images are captured by a digital camera.

24. The apparatus of claim 23, wherein the first image is a relatively high resolution main image, and wherein the second image is a relatively low resolution pre- or post-view version of the first image.

25. The apparatus of claim 23, wherein the first and second images are relatively low resolution pre- and/or post-view versions of a higher resolution main image of said scene also captured by the camera.

* * * * *